(No Model.)
J. G. THOMPSON.
Millstone-Balancing Device.
No. 227,321. Patented May 4, 1880.
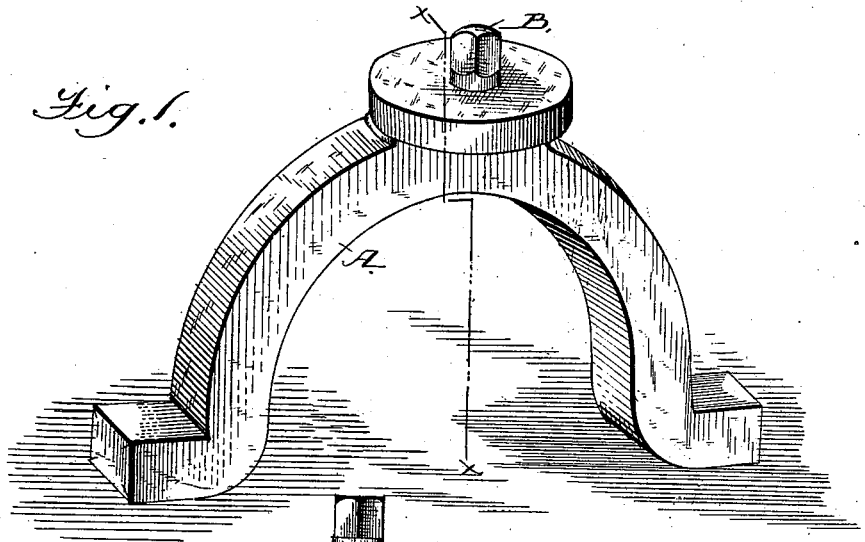
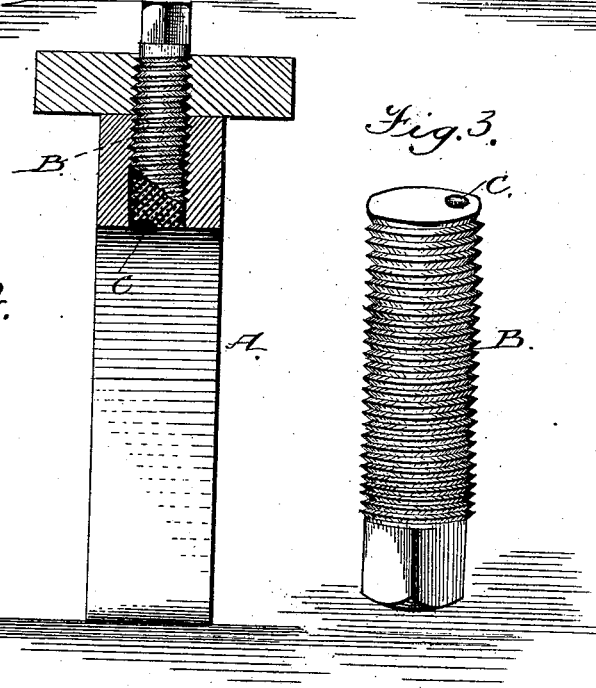
Attest;
J. Walter Fowler
R. K. Evans
Inventor;
Jesse G. Thompson
by A. H. Evans & Co
Attys.
N. PETERS, PHOTO-LITHOGRAPHER, WASHINGTON, D. C.

UNITED STATES PATENT OFFICE.

JESSE G. THOMPSON, OF CLARION, PENNSYLVANIA.

MILLSTONE-BALANCING DEVICE.

SPECIFICATION forming part of Letters Patent No. 227,321, dated May 4, 1880.

Application filed March 2, 1880. (No model.)

*To all whom it may concern:*

Be it known that I, JESSE G. THOMPSON, of Clarion, county of Clarion, State of Pennsylvania, have invented certain new and useful Improvements in Millstone-Balancing Devices; and I hereby declare the following to be a full, clear, and exact description thereof, reference being had to the accompanying drawings, making part of this specification, and in which—

Figure 1 is a perspective view of a balance-rynd with my improvements attached. Fig. 2 is a vertical section of same. Fig. 3 shows the under face of the bolt.

To enable others skilled in the art to make and use my invention, I will proceed to describe the exact manner in which I have carried it out.

My invention relates to balancing the runner-stone of grinding-mills; and it consists in the construction of the upper pivotal bearing for the cock-head so as to readily change the position of the stone by simply turning the screw-head, and without adding weight to the stone.

In the drawings, A represents the balance-rynd, and B the screw-bolt passing vertically through the center of its arc, as shown in Fig. 2. By means of the screw-threads this bolt can be raised or lowered, as required. On the lower face of this bolt is provided the bearing C for the pivotal front of the cock-head. This bearing I make eccentric with the circular face of the bolt, as shown in Fig. 3.

Several such bearings may be made in the same face for the more complete adjustment of the stone.

It is evident to any mechanic skilled in the art of balancing millstones that when the stone is set for grinding and found not to be true it can be readily balanced by simply turning the bolt B, and thereby changing the bearing C to any desired point, and with it the position of the stone.

By having two or more of the bearings on the face of the bolt to suit the cock-head the bolt may be readily adjusted vertically to secure a proper running balance to the stone.

It will be evident to any mechanic skilled in the art of balancing millstones that when the stone is started and found not to be true it may be readily brought to a proper running balance by simply giving a slight turn to the screw-bolt B, thereby changing the pivotal bearing of the cock-head and the vertical adjustment, securing a proper running balance to the stone.

Having thus explained my invention, what I claim as new, and desire to secure by Letters Patent, is—

A balance-rynd in combination with the screw-bolt B, provided on its lower face with the eccentric bearing C for the cock-head, substantially as and for the purpose herein described.

JESSE G. THOMPSON.

Attest:
W. H. MORSELL,
JNO. L. CONDRON.